United States Patent
Morse et al.

(10) Patent No.: US 7,527,659 B2
(45) Date of Patent: May 5, 2009

(54) METAL HYDRIDE FUEL STORAGE AND METHOD THEREOF

(75) Inventors: Jeffrey D. Morse, Martinez, CA (US); Alan F. Jankowski, Livermore, CA (US); Conrad Yu, Antioch, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 232 days.

(21) Appl. No.: 11/546,113

(22) Filed: Oct. 10, 2006

(65) Prior Publication Data

US 2007/0031586 A1 Feb. 8, 2007

Related U.S. Application Data

(62) Division of application No. 10/371,876, filed on Feb. 21, 2003, now Pat. No. 7,122,261.

(51) Int. Cl.
- H01M 69/02 (2006.01)
- H01M 4/82 (2006.01)
- H01M 8/00 (2006.01)
- B05D 5/00 (2006.01)
- H01M 2/08 (2006.01)

(52) U.S. Cl. ............. 29/623.5; 29/623.1; 29/623.2; 429/12; 429/35; 427/115

(58) Field of Classification Search ........ 29/623.1, 29/623.2; 429/12, 35; 427/115
See application file for complete search history.

(56) References Cited

U.S. PATENT DOCUMENTS 6,541,676 B1 4/2003 Franz et al.
6,544,400 B2 * 4/2003 Hockaday et al. ......... 205/338
6,569,553 B1 5/2003 Koripella et al.
6,638,654 B2 * 10/2003 Jankowksi et al. ......... 429/26
2001/0045364 A1 * 11/2001 Hockaday et al. ......... 205/338
2002/0081468 A1 6/2002 Shioya
2002/0094462 A1 7/2002 Shioya et al.
2002/0106540 A1 8/2002 Shioya
2003/0190508 A1 10/2003 Takeyama et al.

OTHER PUBLICATIONS

Aleks J. Franz et al, High Temperature Gas Phase Catalytic and Membrane Reactors.
Francis Jones et al, Experimental System for the Study of Gas-Solid Heterogeneous Catalysis in Microreactors, Microfluidic Devices and Systems III Proceedings of SPIE vol. 4177 pp. 124-131.
Tamara M. Floyd et al, Liquid-Phase and Multi-Phase Microreactors for Chemical Synthesis.
Ravi Srinivasan et al, Micromachined Reactors for Catalytic partial Oxidation Reactions, AIChE Journal Nov. 1997 vol. 43 No. 11 pp. 3059-3068.

* cited by examiner

*Primary Examiner*—Patrick Ryan
*Assistant Examiner*—Julian Mercado
(74) *Attorney, Agent, or Firm*—Alan H. Thompson; John H. Lee

(57) ABSTRACT

Disclosed herein is a metal hydride fuel storage cartridge having integrated resistive heaters that can be used in conjunction with fuel cells such as MEMS-based fuel cells. The cartridge is fabricated using micromachining methods and thin/thick film materials synthesis techniques.

12 Claims, 1 Drawing Sheet

METAL HYDRIDE FUEL STORAGE AND METHOD THEREOF

CROSS REFERENCE TO RELATED APPLICATIONS

This application is a divisional of U.S. patent application Ser. No. 10/371,876 filed Feb. 21, 2003 and now issued as U.S. Pat. No. 7,122,261, which is incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

This invention relates to fuel cells. Work is commonly derived from fuel by a combustion process which uses the pressure of expanding gases to turn a turbine or move a reciprocating piston and, ultimately, to provide torque to a driveshaft. This torque is then usually used for propulsion or to generate electrical power. In the latter case, the electrical power is often reconverted into mechanical work.

SUMMARY OF THE INVENTION

An aspect of the invention includes: an apparatus comprising a first substrate having (1) a cavity, (2) one or more resistive heaters, and (3) one or more electrically isolating, heat conducting coatings; a second substrate having (1) an outlet comprising (a) a hydrogen permaselective membrane and (b) a thick film porous material that forms a pressure relief structure and (2) one or more electrically isolating, heat conducting coatings, wherein the second substrate is bonded to the first substrate forming a sealed volume within the cavity; and a metal hydride material contained within the cavity.

A further aspect of the invention includes a method comprising forming a first substrate having a cavity; positioning one or more resistive heaters in the cavity; coating the cavity and the resistive heaters with one or more materials that are capable of (1) electrically isolating the resistive heaters and (2) conducting heat; filling the cavity with a metal hydride material; forming a second substrate having (1) an outlet comprising (a) a hydrogen permaselective membrane and (b) a thick film porous material that forms a pressure relief structure and (2) one or more electrically isolating, heat conducting coatings; and sealing the cavity by bonding the second substrate to the first substrate.

Another aspect of the invention includes an apparatus comprising a first substrate having an array of cavities containing (1) one or more resistive heaters, and (2) one or more electrically isolating, heat conducting coatings; a second substrate having (1) an array of outlets each comprising (a) a hydrogen permaselective membrane and (b) a thick film porous material that forms a pressure relief structure and (2) one or more electrically isolating, heat conducting coatings, wherein the second substrate is bonded to the first substrate forming a sealed volume within the array of cavities; and a metal hydride material contained within the array of cavities.

DETAILED DESCRIPTION

Figure 1:
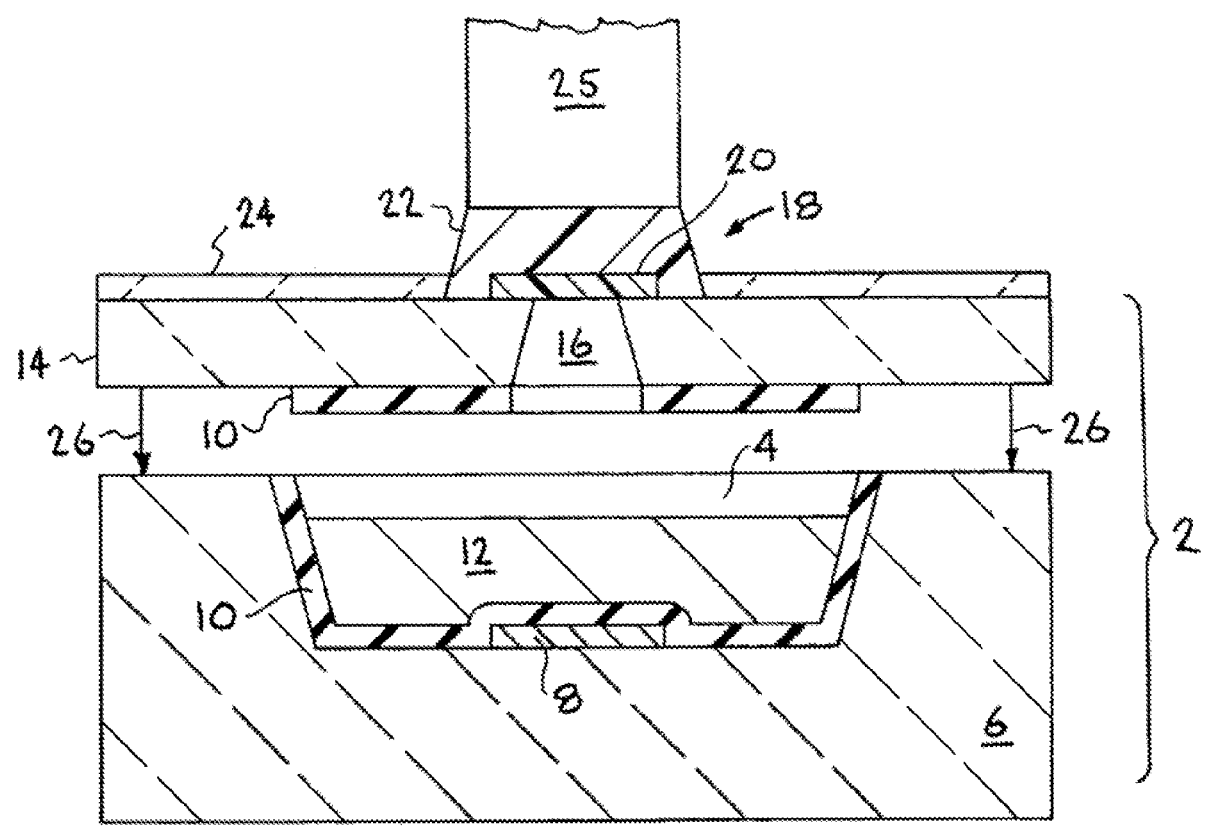
FIG. 1 is a schematic diagram of a metal hydride fuel storage apparatus.

While metal hydride materials have demonstrated the ability to store hydrogen in percentages by weight ranging from 1-10%, the use of this material as a means to store hydrogen fuel for fuel cells and other power generating techniques has been limited, particularly for portable power applications. Typically, the metal hydride is processed as a pressed powder to retain the required porosity, and placed in a vessel made of stainless steel or other high strength material. The vessel has a center flow channel to which the hydrogen outgases and is delivered to the exterior of the container. The limitation to deployment of such storage containers for portable power applications is the power requirements of heating the mass of the containment vessel. The power requirements are not efficient compared to the energy stored as fuel.

Fuel cells disclosed in U.S. patent applications Ser. Nos. 09/967145, 10/261353, 10/131846, 10/261353 assigned to the same assignee can be used in conjunction with the present invention and are all hereby incorporated by reference in their entirety.

Disclosed herein is a metal hydride fuel storage cartridge with integrated heaters. FIG. 1 shows one embodiment of the invention. Referring to FIG. 1, a metal hydride fuel storage cartridge 2 comprises: a cavity 4 in a substrate 6, one or more resistive heaters 8 in said cavity, a cavity coating 10 along said cavity of one or more materials which electrically isolate the resistor and the metal hydride volume (the interior of the cavity), readily conduct heat to uniformly heat the cavity, and provide a diffusion barrier to hydrogen over the temperature range required to outgas the hydrogen from the metal hydride material, a metal hydride material (e.g., Ni, Al, Pd, Ti, or other alloys thereof) 12, a cap 14 comprising a cap coating 10 of one or more materials which electrically isolate the resistor and the metal hydride volume (the interior of the cavity), readily conduct heat to uniformly heat the cavity, and provide a diffusion barrier to hydrogen over the temperature range required to outgas the hydrogen from the metal hydride material, an outlet 16 and an outlet valve 18 comprising a hydrogen permaselective membrane window 20 with a resistive heater (not shown) and a porous membrane pressure relief structure 22. The outlet valve is coupled directly to a microfluidic interconnect or other gas distribution system (not shown). An O-ring 24 made of a dense ceramic material can be used to seal the coupling. The substrates can comprise silicon, glass, plastic or ceramic. Coating 10 may comprise silicon dioxide, polymers (e.g., polyimide, poly methylmethacralate (PMMA)) and metals (e.g., copper or cobalt). The hydrogen permaselective membrane material comprises a high strength polymer (e.g., PMMA, Polyimide) and/or metal alloy (e.g., Pd, Ti) which enables selective gas permeation through the membrane as a function of temperature. The thickness and porosity of the thick film porous material that is formed over the membrane can be tailored to provide a pressure gradient such that the hydrogen flow at the exterior of the valve is at ambient pressure, thereby forming the porous membrane pressure relief structure.

Referring to FIG. 1, the cavity is formed using micromachining methods, for example, etching, molding or hot embossing. The cavity is coated and the coated cavity is then filled with a metal hydride material (e.g., Ni, Al, Pd, Ti, hydrides or hydrides of similar alloys) using thin/thick film materials synthesis techniques, for example, sol gel spin casting, dip coating, spray deposition or sputter deposition. Shadow masking or other patterning methods are used to selectively deposit the metal hydride in the cavity, completely filling the cavity volume. The cavity is sealed after filling by bonding (shown by arrows 26) cap 14 to substrate 6. The final volume of the sealed cavity is determined by the power requirement to heat the metal hydride with the integrated resistive heaters and outgas the hydrogen through the outlet valve. The cavity has enough strength to withstand 20-50 psi pressure as the hydride is heated. The outlet may be constructed on the cap as a microflow channel which can be formed through the cap using micromachining techniques. The valve is formed by positioning a hydrogen permaselective membrane window structure over the microflow channel outlet. The membrane is formed by bonding the appropriate layer over the window. Additionally, the porous membrane pressure relief structure is formed over the membrane window by or coating the layers first, then etching the window from the backside selectively. The thickness and porosity of the porous membrane pressure relief structure can be tailored by control of the baking temperature and coating speed for solgel deposited processes, or the temperature and pressure of deposition for vacuum processes. The O-ring can be aligned to a pre-positioned cavity in a gas manifold system, wherein the alignment can be achieved through a package design in order to provide a modular and replaceable cartridge.

Additionally, the hydride storage cavities can be fabricated in arrays to provide more fuel storage capacity while optimizing the power needed to extract the hydrogen fuel from the cartridge. For applications to miniature fuel cells, effective heat transfer from the fuel cell heat source can also be used as a means to sustain the heat required to remove the hydrogen fuel from the cartridge.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

The invention claimed is:

1. A method comprising:
   forming a first substrate having a cavity;
   positioning one or more resistive heaters in said cavity;
   coating said cavity and said resistive heaters with one or more materials that are capable of (1) electrically isolating said resistive heaters and (2) conducting heat;
   filling said cavity with a metal hydride material;
   forming a second substrate having (1) an outlet comprising (a) a hydrogen permaselective membrane and (b) a porous material that forms a pressure relief structure and (2) one or more electrically isolating, heat conducting coatings; and
   sealing said cavity by bonding said second substrate to said first substrate.

2. The method recited in claim 1, wherein said forming of the cavity is accomplished by micromachining methods.

3. The method recited in claim 1, wherein said filling of the cavity with a metal hydride material is accomplished by using film materials synthesis techniques.

4. The method recited in claim 1, wherein said outlet is formed by (1) coating an opening in said second substrate with a permaselective membrane material using thin film deposition techniques and microfabrication and (2) forming a porous material over the membrane.

5. The method recited in claim 4, wherein a porous material is formed over the membrane by using selective etching from the backside to form the membrane window or bonding of the membrane to the window.

6. The method recited in claim 1, further comprising coupling said outlet to a microfluidic interconnect.

7. The method recited in claim 6, wherein said coupling is accomplished by creating an O-ring around the porous membrane.

8. The method recited in claim 7, wherein said O-ring is comprised of a ceramic material.

9. A method comprising:
   forming a first substrate having a cavity;
   positioning one or more resistive heaters in said cavity;
   coating said cavity and said resistive heaters with one or more materials that are capable of (1) electrically isolating said resistive heaters and (2) conducting heat;
   adding a metal hydride material to said cavity;
   coupling a second substrate to said first substrate, said second substrate having (1) an outlet comprising a hydrogen permaselective membrane.

10. The method recited in claim 9, further comprising coupling said outlet to a microfluidic interconnect or other gas distribution system.

11. The method recited in claim 9, wherein the second substrate includes a porous material that forms a pressure relief structure.

12. The method recited in claim 11, wherein said porous material is formed over the membrane by using selective etching from the backside to form a membrane window or bonding of the membrane to the window.

* * * * *